United States Patent Office 3,464,869
Patented Sept. 2, 1969

3,464,869
PYROTECHNIC COMPOSITIONS CONTAINING METAL FUEL, INORGANIC OXIDIZER SALT, AND A VINYL POLYMER IN A SOLVENT
Vernon Paul Wystrach, Noroton Heights, and Richard Vincent O'Lenick, Stamford, Conn., and Michael Albert Murray, White Plains, N.Y., assignors to American Cyanamid Company, Stamford, Conn., a corporation of Maine
No Drawing. Filed Dec. 13, 1967, Ser. No. 690,094
Int. Cl. C06d 1/10; C06b 11/00, 1/00
U.S. Cl. 149—42                                4 Claims

ABSTRACT OF THE DISCLOSURE

Plastic pyrotechnic compostions comprising (1) a fuel, (2) an oxidizer and (3) a polymer dissolved in an ignitable, volatile solvent to such an extent that the polymer is tacky, are disclosed.

Background of the invention

The instant invention relates to the field of pyrotechnic compositions and more particularly to those compositions which are readily ignitable with a match, and without the use of a fusing device, by military personnel, persons requiring assistance and the like and which also are easily attached to any surface. The compositions are easily ignitable because the pyrotechnic reaction occurs only after combustion of the volatile component. Furthermore, the ignitability is not appreciably changed after exposure to air for lengths of time of at least an hour.

Our novel compositions find increased usage because of the fact that they may be easily attached to any surface due to the tacky consistency of the material per se. The adhesive nature of the material makes possible its use on rough surfaces or smooth surfaces and also allows the composition to be applied where known compositions are not applicable. For example, our novel compositions may be forced into crevices or similar small openings without loss of the capability of the composition to ignite. As mentioned above, the compositions may be ignited with a match and therefore personnel need not transport additional instruments such as fusing devices, etc. in order to ignite or otherwise detonate the composition.

Summary

The novel compositions of the instant invention may be utilized as distress flares, signals or as incendiaries. The compositions may be modified by the addition of various additives so as to produce reduced burning, colored flares or sporadic burning to produce a flashing light phenomenon, thermite putty or welding compositions.

Description of the invention including preferred embodiments

The first critical component (1) of our pyrotechnic compositions is a fuel. Any fuel known in the art, e.g. those disclosed as useful in rocket propellant compositions, may be utilized in our novel compositions without detracting from the efficiency of the resultant material. Examples of fuels include aluminum, boron, beryllium, magnesium, lithium, aluminum hydride, lithium hydride, lithium aluminum hydride, beryllium hydride, magnesium hydride, zirconium hydride, solid boron hydrides and various materials such as $B_{10}C_2H_{12}$, $B_{10}C_2H_{11}Z$ wherein Z is an aliphatic radical and boron-nitrogen-hydrogen compounds known in the art such as those disclosed in U.S. Patent Nos. 3,351,505 and 3,255,059, which patents are hereby incorporated herein by reference. The concentration of the fuel in our novel compositions should range from about 20% to about 40%, by weight, based on the total weight of the composition.

The second critical component (2) of our novel compositions is an oxidizer. As in regard to the fuels, any oxidizer known in the art as taught by the above-mentioned U.S. patents, may be utilized with such materials as ammonium perchlorate, potassium perchlorate, sodium perchlorate, lithium perchlorate, calcium nitrate, barium sulfate, ammonium nitrate, potassium nitrate, sodium nitrate, lithium nitrate, potassium bromate, molybdenum trioxide, sodium percarbonate, lithium percarbonate, potassium percarbonate, aluminum percarbonate, sodium perborate, lithium perborate, potassium perborate, aluminum perborate, perchloric acid, ammonium persulfite, potassium permanganate, manganese dioxide, sodium iodate, potassium dichromate, chloric acid, perchloryl benzene, perchloryl naphthalene, mixtures thereof and the like being exemplary. The oxidizers, alone or in admixture, are utilized in concentrations totaling from about 40% to about 60%, by weight, based on the total weight of the composition, with the total of component (1) and component (2) comprising at least 60%, by weight, of the composition and preferably at least 75%, by weight, of the composition.

The third critical component (3) of our novel compositions is a solution of a polymer in an ignitable, volatile solvent, the concentration of solvent being sufficient to render the polymer tacky. As can be readily appreciated, such amounts of solvent depend directly upon the polymer and the solvent utilized. In other words, different amounts of different solvents when added to various polymers will create polymer solutions of such consistency so as to create a tacky surface capable of adhering to almost any material. Examples of suitable polymers include homopolymers and copolymers of such monomers as the alkyl acrylates and methacrylates wherein the alkyl group contains from 1 to 6 carbon atoms; the polyalkylene oxides such as polyethylene oxide, polypropylene oxide and the like; polymers of acrylonitrile such as polyacrylonitrile and acrylonitrile, styrene, acrylate copolymers etc.; polyvinyl chloride, etc.; rubbery, so-called, impact polymers such as those produced from butadiene-styrene copolymers, butadiene-acrylonitrile copolymers, butadiene polymer-acrylate polymer blends etc.; polyolefins such as polyethylene, polypropylene and the like and generally any linear, non-cross-linked (i.e. soluble) polymer including thermoplastic polyesters such as those taught in U.S. Patent No. 3,212,898, hereby incorporated herein by reference.

The polymer solutions may be prepared by utilizing any solvent which is known for any specific polymer in varying concentrations. For example, dimethyl formamide may be utilized for the acrylate and methacrylate polymers, dimethyl sulfoxide may be utilized for the polyalkylene oxide polymers, benezene may also be utilized for the acrylate polymers, gasoline may be utilized for the butadiene copolymers etc. It is also clear that any volatile monomer which is ignitable and which forms a component of the polymer per se may be utilized as the solvent therefor. As mentioned above, these particular solvent-polymer solutions are condsidered to be well known in the art and the particular solvents, polymers or solutions thereof per se form no part of the instant invention.

A preferred polymer system which we have found to be unusually attractive is a terpolymer of from about 1% to about 5% of acrylic acid, from about 50% to about 90% of acrylonitrile and from about 10% to about 50% of methyl methacrylate, said percentages being by weight based on the total weight of the polymer, in a solvent of acrylonitrile at 5% solids. The amount of polymer solution utilized in our novel compositions should range from about 10% to about 40%, by weight, based on the total weight of the composition, the total weight percent of components (1), (2), and (3), of course, being 100%.

It is also within the scope of the present invention to utilize polymeric materials which even when dissolved in an ignitable volatile solvent are not tacky. We utilize this type of polymer by the addition to the ultimate composition of a tackifier, the polymer and tackifier constituting component (3), the amount of tackifier being that necessary to produce a tacky polymer. As is known in the art, various polymers may be made tacky by the addition containing 5% of a terpolymer of acrylic acid, acrylonitrile and methyl methacrylate (3/87/10) are then added and the ingredients are combined by hand mixing. The resultant putty-like composition adheres easily to a smooth, vertical surface. The composition is then ignited by hand with a match. The volatiles burn off and subsequently ignite the magnesium-sodium nitrate pyrotechnic mixture, producing a bright, yellow flame.

Following the procedure of Example 1, various fuels, oxidizers and polymer solutions are blended to produce pyrotechnic compositions. In each instance the results obtained are similar to those set forth in Example 1. The various compositions are set forth in table below.

TABLE

| Example | Fuel, percent | Oxidizer, percent | Polymer, percent solution | Tackifier, percent | Results |
|---|---|---|---|---|---|
| 2 | Mg, 30 | $NaNO_3$, 30+$Ca(NO_3)_2$, 15. | Same as Ex. 1-9 | Same as Ex. 1-16 | Good flare. |
| 3 | Mg, 25 | $NaNO_3$, 30+$BaSO_4$, 20. | Same as Ex. 1-10 | Same as Ex. 1-15 | Burns green at sporadic 5 second intervals. |
| 4 | Al, 37 | $Fe_2O_3$, 35+$Ca(N)_3)_2$, 10. | Same as Ex. 1-18 | | Incendiary. |
| 5 | Boron, 40 | $NH_4NO_3$, 40 | Copolymer of butadiene/styrene (60/40) in gasoline solvent, 10% solids, 20. | | Excellent signal flare. |
| 6 | $AlH_3$, 35 | $KClO_4$, 30 | Polyethylene oxide in dimethyl sulfoxide, 8% solids, 13. | Wing-Tack, a tackifier commercially available from Goodyear Rubber Co., 22. | Do. |
| 7 | Be, 25 | $Al_2C_2O_6$, 45 | Polyvinyl chloride in acrylonitrile, 12; solids, 10. | Same as Ex. 1-20 | Excellent signal flare. |
| 8 | $B_{10}C_2H_{12}$, 32 | $HClO_4$, 33 | Polyethylene in benzene, 8; solids, 15 | A commercially available glycidyl ester of rosin, 20. | Do. |
| 9 | Li, 29 | $MgO_2$, 5+$NaNO_3$, | Thermoplastic polyester in ethylene glycol, 10; solids, 15. | Same as Ex. 1-11 | Do. | thereto of so called tackifiers. These compositions are well known in the art and are not believed to warrant extensive enumeration herein. However, such tackifiers as Napalm B which is a gasoline/styrene polymer/benzene mixture; and other commercially available materials known to those skilled in the art such as glycidyl esters of rosin, veratic acid or unsaturated tall oil fatty acids may be used.

The components of our novel composition may be blended together in the above-specified concentrations in any order or by the use of any blending technique. It is usually preferred, however, to add the solid fuel and oxidizer to the pasty or putty-like tacky polymer solution and to agitate or mix the resultant blend such as by hand mixing or by utilizing a putty chaser, sigma mixer, etc. until the composition contains all the components thereof in a relatively uniform homogeneous combination.

The compositions of the present invention may be modified further by the addition of inert fillers such as silica hydrogels, diatomaceous earth and any of a vast variety of column supports typically used in gas chromatography, to reduce the burning rate of the composition. Additionally, such ingredients as barium, cerium, cobalt, copper and nickel salts may be added to produce colored flares, while materials such as $Fe_2O_3$ can also be added to produce incendiary compositions. We have also found that the addition of large percentages of $BaSO_4$ produces periodic flaring having a frequency of approximately 5 seconds in the pyrotechnic. This flaring effect is valuable in a distress flare since a flashing source is more readily noticed.

The following examples are set forth for purposes of illustration only and are not to be construed as limitations on the present invention except as set forth in the appended claims. All parts and percentages are by weight unless otherwise specified.

Example 1

To a suitable mixing vessel are added 33 parts of magnesium, 46 parts of sodium nitrate and 12 parts of Napalm B (a commercially available gasoline-benzene-polystyrene tackifier). Ten parts of a solution of acrylonitrile

We claim:

1. A pyrotechnic composition comprising from about 20% to 40%, by weight, of a metal fuel, from about 40% to about 60%, by weight, of an inorganic perchlorate or nitrate oxidizer and from about 10% to about 40%, by weight, of a vinyl polymer dissolved in an ignitable, volatile solvent, said percentages being based on the total weight of the composition and the total weight of said fuel, oxidizer and polymer being 100%.

2. A composiion according to claim 1 wherein the fuel is magnesium, the oxidizer is sodium nitrate and the polymer is a terpolymer of acrylic acid, acrylonitrile and methyl methacrylate dissolved in acrylonitrile.

3. The composition of claim 1 containing, in addition thereto, a tackifier selected from the group consisting of gasoline/styrene polymer/benzene mixtures, glycidyl esters of rosin, veratic acid or unsaturated tall oil fatty acids.

4. A composition according to claim 3 wherein the tackifier is a gasoline/styrene polymer/benzene mixture.

References Cited

UNITED STATES PATENTS

| 2,530,491 | 11/1950 | Van Loenen | 149—44 X |
| 2,530,493 | 11/1950 | Van Loenen | 149—43 X |
| 3,140,207 | 7/1964 | Williams | 149—44 X |
| 3,162,558 | 12/1964 | Bishop et al. | 149—44 X |
| 3,198,678 | 8/1965 | Zeman et al. | 149—44 |
| 3,258,373 | 6/1966 | Douda | 149—44 X |
| 3,261,731 | 7/1966 | Lopatin et al. | 149—44 X |
| 3,262,824 | 7/1966 | McGriffin et al. | 149—44 X |
| 3,275,484 | 9/1966 | Foote et al. | 149—44 X |
| 3,370,537 | 2/1968 | Tepper | 149—43 X |

BENJAMIN R. PADGETT, Primary Examiner

S. J. LECHERT, Assistant Examiner

U.S. Cl. X.R.

149—43, 44, 61